M. LEITCH.
MILKING MACHINE.
APPLICATION FILED NOV. 18, 1915.

1,196,000.

Patented Aug. 29, 1916.

WITNESS:

INVENTOR
Meredith Leitch
BY
Frank L. Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE.

1,196,000.  Specification of Letters Patent.  Patented Aug. 29, 1916.

Application filed November 18, 1915. Serial No. 62,118.

*To all whom it may concern:*

Be it known that I, MEREDITH LEITCH, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

It is known, in milking machines, to provide means to compress two of the teats while pressure upon the other two is released and alternately therewith to release the pressure upon the first-named teats and apply pressure to the other two teats. For example, this has been effected, in double chamber teat cups, by pneumatic means in the von Bechtolsheim Patent No. 678,231, dated July 9, 1901; while a British patent to the same inventor, No. 2661 of 1899 shows similar mechanism in connection with continuous suction in the inner teat cup chamber.

It is also known to provide means, accomplishing the same result, comprising a vacuum line connected with a milk discharge from the inner teat cup chambers, a pulsation line, and a valve, controlled by the pulsations in the latter, which acts to admit atmospheric air into the inflators of one pair of teat cups while exhausting into the milk discharge atmospheric air that has previously been admitted into the inflators of the other pair of teat cups, and to then reverse the process-admitting air to the inflators of the second pair of teat cups and simultaneously exhausting air from the inflators of the first pair of teat cups. Such a machine is set forth in the application of Robert Bruce Forsyth, filed February 25, 1914, Serial No. 820,851, but this process involves the possibility of some contamination of the milk by reason of the admission in contact therewith of air that has been used to inflate the teat cups.

The objects of my invention are to provide a milking machine, having the mode of operation and all the advantages of the Forsyth construction, in which there is no possibility of contamination of the milk by foul air, and also to provide a simplified apparatus which will lend itself to being mounted upon the pail—that is, contained within, or carried by, the lid thereof.

A preferred embodiment of my invention is shown in the accompanying drawings, in which—

Figure 1:
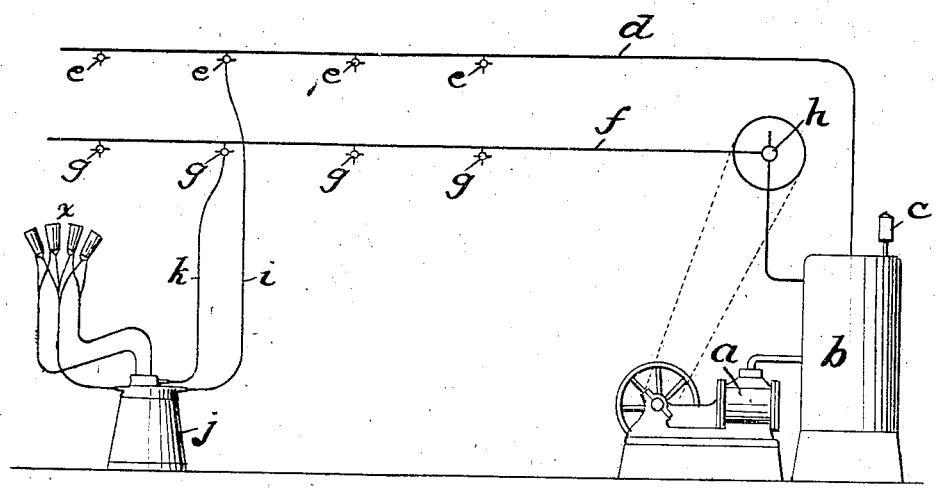
Figure 2:
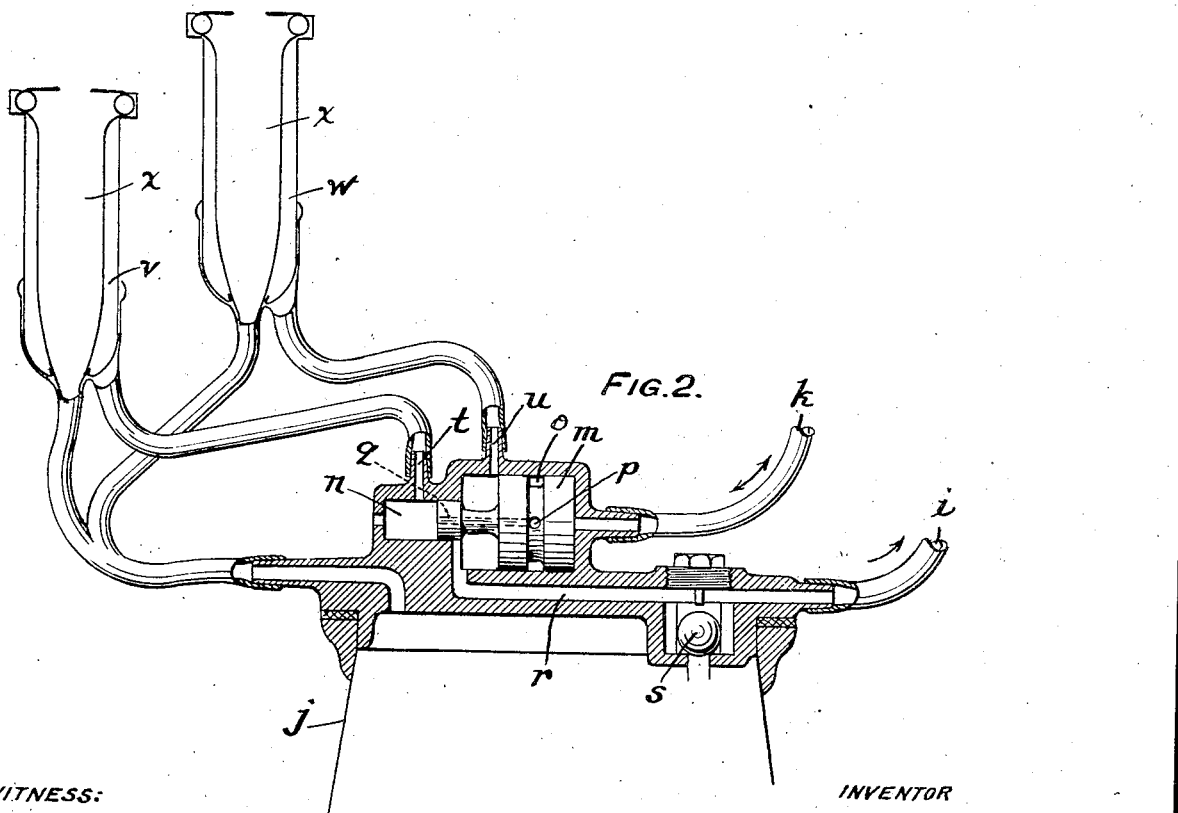

Figure 1 is a diagrammatic view of a complete installation. Fig. 2 is a section of a pail top and pulsator valve, the pipe connections thereto, the teat cups, and the connections between the latter and the valve.

$a$ is a vacuum pump adapted to exhaust air from a reservoir $b$.

$c$ is a safety valve that admits air to the reservoir whenever the vacuum is greater than desired. From the reservoir $b$ a vacuum pipe line $d$ extends throughout the barn with cocks $e$ at points convenient to the stanchions. A pulsation pipe line $f$ with cocks $g$ also extends through the barn and is connected, by a master valve $h$, with the tank $b$ and the atmosphere alternately. The valve $h$ is driven from the same power as the pump $a$. A flexible pipe $i$ connects a passage $r$ in the top of the milk pail $j$ with the vacuum pipe line $d$. Another flexible pipe $k$ connects the pulsation pipe $f$ with a pulsator valve on the pail cover.

The cylinder of the pulsator valve has a large bore $m$ and a small bore $n$, and a differential piston works in these bores. The center of the cylinder is in communication with the passage $r$, the large end with the pulsation pipe $k$, and the small end with the atmosphere. From the side of the small bore $n$ a port $t$ opens toward the inflators $v$ of two teat cups (only one is shown in the drawing). From the side of the large bore $m$ a port $u$ opens toward the inflators $w$ of the other two cups. The large and small heads of the differential piston are connected by a portion smaller in diameter than the smaller head. Around the middle of the large head is an annular passage $o$ connected by a cross hole $p$ with a central hole $q$ opening through the small piston. The teat chambers $x$ of the cups are connected with the pail $j$.

When in operation the pump $a$ exhausts air from the tank $b$, the pipe line $d$, the pipe $i$, the passage $r$, the pail $j$, the inner chambers of the teat cups, and the differential part of the pulsator valve; a check valve $s$ between passage $r$ and the pail preventing the admission of air from the passage $r$ to the pail in the event of a temporary rise in pressure in the vacuum line. The valve $h$ connects the pulsation pipe $f$ alternately with the tank $b$ and with the atmosphere, thus causing a pulsating vacuum in the pipe. When the pipe $k$ is connected to the line $f$ and the partial vacuum exists in $f$, air is exhausted from the large bore $m$. The low pressure is balanced on the differential area and exceeded by atmospheric pressure on the area of the small piston, so that the differential piston moves to the position shown in the drawing. The inflator of the left cup receives atmospheric pressure through port $t$ and, because of the vacuum in the teat chamber, collapses and squeezes the teat, expelling the milk; while the inflator of the right cup is exhausted through port $u$ into the passage $r$ and the vacuum pipe $i$, and the teat is allowed to hang free and fill with milk. When atmospheric pressure exists in the pipe line $f$ and passes into the large bore $m$, it is partly balanced by atmospheric pressure on the small piston but exceeds the pressure on the differential area, so the piston moves to the left. The inflator of the left cup is now connected with vacuum through the port, passage $r$ and pipe $i$, and that of the right cup is connected with the atmosphere by the annular passage $o$, cross hole $p$ and central hole $q$.

The check valve $s$ in the connection between the pail and the passage leading to the pipe $i$ prevents foul air from the teat cups entering the pail and contaminating the milk.

While in the claims I refer, for the sake of simplicity, to only two teat cups, it will be understood that I intend more especially to cover a construction wherein each of these two cups is one of a pair.

Having now fully described my invention, what I claim and desire to protect by Letters Patent is:

1. In a milking machine, the combination with two double-chambered teat cups, of a pipe line, a vacuum line, a milk discharge connecting the vacuum line and the inner teat cup chambers, means to produce pneumatic pulsations in the first line and a partial vacuum in the second line, and means controlled by said pneumatic pulsations to admit air to the inflation chamber of one cup while exhausting air from the inflation chamber of the other cup into the vacuum line independently of the milk discharge, and vice versa.

2. In a milking machine, the combination with two double-chambered teat cups, of a pulsation pipe line and a vacuum pipe line, and means to produce pneumatic pulsations in the first line and a partial vacuum in the second line, a milk discharge from the inner teat cup chambers, means connecting the milk discharge and the vacuum line, a pulsator valve connected with, and whose operation is controlled by the pulsations in, the pulsation line, and ports and passages coöperating with the valve to admit air to the outer chamber of one teat cup and exhaust air from the outer chamber of the other teat cup into the vacuum line independently of the milk discharge and alternately therewith to admit air into the outer chamber of the second teat cup and exhaust air from the outer chamber of the first teat cup into the vacuum line independently of the milk discharge.

3. In a milking machine, the combination with two double-chambered teat cups, of a pulsation pipe line and a vacuum pipe line, and means to produce pneumatic pulsations in the first line and a partial vacuum in the second line, a milk discharge from the inner teat cup chambers, a pulsator valve connected with, and whose operation is controlled by the pulsations in, the pulsation line, a check valve between the vacuum line and the milk discharge preventing flow of air from the former to the latter, and ports and passages coöperating with the pulsator valve to admit air to the outer chamber of one teat cup and at the same time exhaust air from the outer chamber of the other teat cup into the vacuum line and vice versa.

4. In a milking machine, the combination with two double-chambered teat cups, of a pulsation pipe line and a vacuum pipe line, and means to produce pneumatic pulsations in the first line and a partial vacuum in the second line, of a milk discharge from the inner teat cup chambers, a milk pail connected with the milk discharge, a check valve between the vacuum line and the pail, a pulsator valve connected with, and whose operation is controlled by the pulsations in, the pulsation line, and ports and passages coöperating with the valve to admit air to the outer chamber of one teat cup and at the same time exhaust air from the outer chamber of the other cup into the vacuum line, and vice versa.

5. In a milking machine, the combination with two double-chambered teat cups, of a pulsation pipe line and a vacuum pipe line and means to produce pneumatic pulsations in the first line and a partial vacuum in the second line, a milk pail, a milk discharge from the inner teat cup chambers to the pail, a check valve between the vacuum line and the pail, a valve comprising a cylinder of two diameters and a differential valve piston reciprocable therein, the larger end of the cylinder opening to the pulsation line and the smaller end to the atmosphere, the cylinder having two ports respectively in its larger and smaller ends, means for connecting said ports respectively with the outer chambers of the two teat cups, means to connect the larger end of the cylinder with the vacuum line, the larger end of the piston being cut away to form a surrounding annular groove, the piston having a passage from its small end to said groove.

In testimony of which invention, I have hereunto set my hand, at Poughkeepsie, N. Y., on this 13 day of Nov., 1915.

MEREDITH LEITCH.